US012194478B2

(12) United States Patent
Larsson

(10) Patent No.: US 12,194,478 B2
(45) Date of Patent: Jan. 14, 2025

(54) CENTRIFUGAL SEPARATION SYSTEM AND METHOD OF OPERATING A CENTRIFUGAL SEPARATOR

(71) Applicant: Alfa Laval Corporate AB, Lund (SE)

(72) Inventor: Per-Gustaf Larsson, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 553 days.

(21) Appl. No.: 17/630,585

(22) PCT Filed: Jul. 3, 2020

(86) PCT No.: PCT/EP2020/068856
§ 371 (c)(1),
(2) Date: Jan. 27, 2022

(87) PCT Pub. No.: WO2021/032353
PCT Pub. Date: Feb. 25, 2021

(65) Prior Publication Data

US 2022/0250091 A1 Aug. 11, 2022

(30) Foreign Application Priority Data

Aug. 19, 2019 (EP) .................................... 19192213

(51) Int. Cl.
*B04B 11/02* (2006.01)
*B04B 1/08* (2006.01)
*B04B 13/00* (2006.01)

(52) U.S. Cl.
CPC ................ *B04B 11/02* (2013.01); *B04B 1/08* (2013.01); *B04B 2013/006* (2013.01)

(58) Field of Classification Search
CPC ..... B04B 11/02; B04B 1/08; B04B 2013/006; B04B 1/14; B04B 13/00; B04B 1/12
See application file for complete search history.

(56) References Cited

U.S. PATENT DOCUMENTS 3,408,000 A 10/1968 Nilson
3,750,940 A 8/1973 Nilsson
(Continued)

FOREIGN PATENT DOCUMENTS

CN 2142369 Y 9/1993
CN 101384371 A 3/2009
(Continued)

OTHER PUBLICATIONS

English translation of the Russian Search Report for Russian Application No. 2022107078, dated Jun. 7, 2022.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A centrifugal separator includes a rotor, and a control system. The control system includes a first and a second pressure sensor arranged at first and second radial positions in a separation space of the rotor. The first and second pressure sensors are positioned to be submerged in process liquid during operation of the centrifugal separator. A control unit of the control system is configured to determine a parameter of the process liquid within the separation space during operation of the centrifugal separator based on measurements from the first and second pressure sensors.

20 Claims, 7 Drawing Sheets

(56) References Cited

U.S. PATENT DOCUMENTS

| | | | |
|---|---|---|---|
| 3,752,389 | A | 8/1973 | Nilsson |
| 3,986,663 | A | 10/1976 | Jonsson et al. |
| 5,948,271 | A | 9/1999 | Wardwell et al. |
| 6,976,948 | B1 | 12/2005 | Hamblad |
| 7,485,084 | B2 | 2/2009 | Borgström et al. |
| 7,635,328 | B2 | 12/2009 | Hinman et al. |
| 2009/0137377 | A1 | 5/2009 | Astrom |
| 2010/0175311 | A1 | 7/2010 | Allen et al. |
| 2013/0065744 | A1 | 3/2013 | Karlsson |
| 2015/0045199 | A1 | 2/2015 | Thorwid et al. |
| 2016/0271626 | A1 | 9/2016 | Bergström et al. |
| 2018/0117601 | A1 | 5/2018 | Borgström et al. |
| 2018/0304277 | A1 | 10/2018 | Heinrichs et al. |
| 2018/0353973 | A1 | 12/2018 | Hilding |

FOREIGN PATENT DOCUMENTS

| | | | |
|---|---|---|---|
| DE | 10 2005 018 758 | A1 | 10/2006 |
| EP | 2 623 206 | A1 | 8/2013 |
| EP | 2 868 210 | A1 | 5/2015 |
| EP | 3 085 449 | A1 | 10/2016 |
| EP | 3 323 490 | A1 | 5/2018 |
| FR | 2 331 381 | A1 | 6/1977 |
| JP | 2002-66382 | A | 3/2002 |
| JP | 2002-119891 | A | 4/2002 |
| JP | 2002-537997 | A | 11/2002 |
| JP | 2003-501235 | A | 1/2003 |
| JP | 2013-517939 | A | 5/2013 |
| JP | 2020-523195 | A | 8/2020 |
| RU | 2 577 261 | C1 | 3/2016 |
| SE | 345 603 | B | 6/1972 |
| SE | 348 121 | B | 8/1972 |
| SE | 0500534 | L | 9/2006 |
| SE | 1450971 | A1 | 2/2016 |
| SU | 577946 | A3 | 10/1977 |
| SU | 986506 | A1 | 1/1983 |
| SU | 1597221 | A1 | 10/1990 |
| WO | WO 97/20634 | A1 | 6/1997 |
| WO | WO 00/53331 | A1 | 9/2000 |
| WO | WO 00/74858 | A1 | 12/2000 |
| WO | WO 01/10562 | A1 | 2/2001 |
| WO | WO 2006/096113 | A1 | 9/2006 |
| WO | WO 2007/088114 | A1 | 8/2007 |
| WO | WO 2007/094715 | A1 | 8/2007 |
| WO | WO 2011/093784 | A1 | 8/2011 |
| WO | WO 2013/143999 | A1 | 10/2013 |
| WO | WO 2016/028214 | A1 | 2/2016 |
| WO | WO 2016/084022 | A1 | 6/2016 |
| WO | WO 2016/170091 | A1 | 10/2016 |
| WO | WO 2018/228992 | A1 | 12/2018 |

OTHER PUBLICATIONS

European Search Report for Europe Application No. 22 15 6717, dated May 6, 2022.

Japanese Notice of Allowance for 2023-044677, dated May 7, 2024, with an Engish translation.

“Centrifugal Separator with a Device for Indicating a Sludge Level in a Centrifuge Rotor Associated Sludge Room at Centrifugal Separator with Hermetic Inlet” Kenneth Mason Publications Ltd, Jun. 2007, 9 pages total, with English translation.

Wang et al., “Design of Virtual Condition Monitoring System for Two-spool Internal Screening Crusher” Coal Mine Machinery, vol. 31, No. 07, Jul. 2010, pp. 147-148, with English abstract.

Chinese Notice of Allowance and Search Report for Chinese Application No. 202080058438.9, dated Aug. 28, 2023, with an English translation of the Chinese Notice of Allowance.

Niu et al., “Numerical Simulation of Pressure Field and Velocity Field in Drum of Disc Separator”, China Academic Journal Electronic Publishing House, vol. 1, 2018, 4 pages total, with an English abstract.

International Search Report, issued in PCT/EP2020/068856, dated Sep. 14, 2020.

Written Opinion of the International Searching Authority, issued in PCT/EP2020/068856, dated Sep. 14, 2020.

CENTRIFUGAL SEPARATION SYSTEM AND METHOD OF OPERATING A CENTRIFUGAL SEPARATOR

TECHNICAL FIELD

The invention relates to a centrifugal separation system, and to a method of operating a centrifugal separator.

BACKGROUND

During use of a centrifugal separator, a parameter of a liquid feed mixture or its separated light and heavy phase constituents may be measured. The measured parameter may be utilised for monitoring and/or controlling the separation of the liquid feed mixture into the light and heavy phases.

U.S. Pat. No. 7,485,084 discloses a centrifugal separator and a method of separating a product to a heavy phase and light phase. A centrifuge rotor encloses a closed separation space, which has a radially outer part for the heavy phase, a radially inner part for the light phase and a central gas-filled space. The radially outer part is separated from the radially inner part by an interface layer level. An inlet extends into the separation space for feeding the product. A first outlet extends from the radially outer part for discharge of the heavy phase. A second outlet extends from the radially inner part for discharge of the light phase. A control equipment permits control of the interface layer level to a desired radial position. A sensor senses a parameter related to the gas pressure in the central space. The control equipment controls the counter pressure in the first outlet in response to the sensed parameter for controlling the interface layer level to the desired radial position.

U.S. Pat. No. 3,408,000 discloses a centrifugal separator comprising two pipes extending into a sludge space of a separation space of a rotor of the centrifugal separator. Each of the pipes is hermetically connected to a stationary duct extending from the separator. Pressure sensing devices are arranged in the ducts. Sludge is discharged via radially outer sludge outlet openings in the rotor when a predetermined pressure difference is attained.

SUMMARY

Relying on indirect measurements of parameters of process liquids within a centrifugal separator via gas or pipes and ducts may prove unreliable, or not possible with certain types of centrifugal separators.

It would be advantageous to overcome, or at least alleviate, at least one of the above mentioned drawbacks. In particular, it would be desirable to provide reliable determining of parameters related to the separation of a liquid feed mixture within a centrifugal separator. To better address one or more of these concerns, according to different aspects, a centrifugal separation system having the features defined in one of the independent claims, and a method of operating a centrifugal separator defined in a further independent claim are provided.

According to an aspect of the invention, there is provided a centrifugal separation system comprising a centrifugal separator configured for separating a liquid feed mixture into a light phase and a heavy phase, and a control system. A process liquid comprises one or more of the liquid feed mixture, the light phase, and the heavy phase. The centrifugal separator comprises a rotor configured to rotate about a vertical axis of rotation and being provided with a separation space. The centrifugal separator further comprises an inlet leading into the separation space, a light phase outlet leading from the separation space, a heavy phase outlet leading from the separation space, and a stack of separation disks arranged inside the separation space. The control system comprises a first pressure sensor arranged at a first radial position in the separation space, and a control unit. The control system comprises a second pressure sensor arranged at a second radial position in the separation space. The first radial position is radially outside the second radial position, wherein the first and second pressure sensors are positioned to be submerged in the process liquid during operation of the centrifugal separator, and wherein the control unit is configured to determine a parameter of the process liquid within the separation space during operation of the centrifugal separator based on measurements from the first and second pressure sensors.

Since the first and second pressure sensors are arranged at the different radial positions in the separation space and the first and second pressure sensors are submerged in the process liquid, and since the control unit is configured to determine a parameter of the process liquid within the separation space during operation of the centrifugal separator based on measurements from the first and second pressure sensors—conditions are provided for utilising the parameter during operation of the centrifugal separation system.

According to a further aspect of the invention, there is provided a method of operating a centrifugal separator configured for separating a liquid feed mixture into a light phase and a heavy phase. A process liquid comprises one or more of the liquid feed mixture, the light phase, and the heavy phase. The centrifugal separator comprises a rotor configured to rotate about a vertical axis of rotation and being provided with a separation space, an inlet leading into the separation space, a light phase outlet leading from the separation space, a heavy phase outlet leading from the separation space, a stack of separation disks arranged inside the separation space, a first pressure sensor arranged at a first radial position in the separation space, and a second pressure sensor arranged at a second radial position in the separation space. The first radial position is radially outside the second radial position. The method comprises steps of:

- rotating the rotor,
- conducting liquid feed mixture into the separation space via the inlet,
- submerging the first and second pressure sensors in the process liquid,
- measuring a first pressure with the first pressure sensor,
- measuring a second pressure with the second pressure sensor, and
- determining a parameter of the process liquid based on the first and second pressures.

Since the method comprises the steps of submerging the first and second pressure sensor in the process liquid, measuring the first pressure, measuring the second pressure, and determining the parameter of the process liquid based on the first and second pressures, conditions are provided for utilising the parameter during operation of the centrifugal separator, and/or during operation of a system comprising the centrifugal separator.

The centrifugal separator may also be referred to as a disc stack centrifugal separator. The centrifugal separator may be a high speed centrifugal separator, i.e. a centrifugal separator wherein the rotor is rotated about the vertical axis of rotation at one or more thousands of revolutions per minute, rpm. The rotor may also be referred to as a, separator rotor, a separator bowl, or a bowl.

The rotor may be arranged inside a stationary housing of the centrifugal separator. The rotor may be driven to rotate about the vertical axis of rotation by a drive arrangement comprising e.g. an electric motor.

During separation of the liquid feed mixture into the light phase and the heavy phase, the heavy phase is collected in a circumferential portion at the periphery of the separation space. The circumferential portion extends in a circumferential direction of the separator rotor and thus, may form an imaginary ring or torus inside the separation space.

The liquid feed mixture may have a solid matter content. The solid matter may be separated from the liquid feed mixture as part of the heavy phase. Thus, the heavy phase may form a solid matter suspension, such as a concentrated solid matter suspension. Alternatively, the solid matter content may form part of a sludge phase which leaves the separation space via a sludge outlet. The further alternative may be that the liquid feed mixture comprises a liquid sludge phase which is heavier than the heavy phase. Also in this latter alternative, the sludge phase may leave the separation space via a sludge outlet.

The term process liquid relates to all matter, mixed or separated, being processed in the centrifugal separator during operation of the centrifugal separator. Accordingly, the term process liquid relates to each of the liquid feed mixture and its constituents, including any solid particles, i.e. the light phase, the heavy phase, and sludge, if present.

The parameter of the process liquid may be e.g. a pressure difference between measurements of the first and second pressure sensors, a radial position of an interface between the light phase and the heavy phase, or a density of the heavy phase.

Submerging the first and second pressure sensors means that at least the pressure sensitive portions of the first and second pressure sensors are submerged in process liquid. That is, the first and second pressure sensors are mounted in the rotor or parts thereof such that at least the pressure sensitive portions of the sensors will be covered by process liquid during operation of the centrifugal separator.

The first pressure sensor is configured to communicate with the control unit. The second pressure sensor is configured to communicate with the control unit. Since the first and second pressure sensors are arranged at radial positions in the separation space, naturally, they are arranged in the rotor and thus, arranged to rotate with the rotor. Also, the control unit may be arranged in the rotor and arranged to rotate with the rotor.

According to embodiments, the centrifugal separation system may comprise a flow controlling means, wherein the control unit may be configured to control the flow controlling means based on the parameter. In this manner, the determined parameter may be utilised during operation of the centrifugal separation system. The flow controlling means may control one or more of a flow of the liquid feed mixture, the light phase, and/or the heavy phase.

According to embodiments, the rotor may comprise nozzles arranged at an outer periphery of the rotor. The nozzles may form the heavy phase outlet or a sludge outlet. The flow controlling means may comprise a slidable bowl bottom configured to open and close the nozzles. In this manner, the control unit may control ejection of separated heavy phase and/or separated sludge from the separation space via the nozzles based on the determined parameter by controlling the slidable bowl bottom. Thus, ejection of the heavy phase and/or sludge may be performed when required, based on e.g. a particular value of the determined parameter, as opposed to at regular intervals. The latter may lead to light phase being ejected with the heavy phase, or heavy phase being ejected with the sludge, or heavy phase or sludge building up within the separation space. Accordingly, by controlling the slidable bowl bottom based on the determined parameter, less product may be wasted and clogging of the nozzles may be prevented.

According to embodiments, the first pressure sensor may be arranged radially outside the stack of separation disks. In this manner, the first pressure sensor may measure a pressure taking into account the heavy phase and/or sludge accumulated in the separation space radially outside of the stack of separation discs. Accordingly, the determined parameter may reflect a measurement affected by the heavy phase and/or sludge in the separation space.

According to embodiments, the second pressure sensor may be arranged radially outside the stack of separation disks. In this manner, the second pressure sensor may measure a pressure taking into account the heavy phase and/or sludge accumulated in the separation space radially outside of the stack of separation discs. The determined parameter may reflect e.g. a filling degree of the separation space with heavy phase and/or sludge, or a density of the heavy phase and/or sludge.

According to embodiments, the second pressure sensor may be arranged radially within or radially inside the stack of separation disks. In this manner, the second pressure sensor may measure a pressure taking into account the light phase separated in the separation space radially within or radially inside of the stack of separation discs. Accordingly, the determined parameter may reflect a measurement affected by the light phase in the separation space. The determined parameter may reflect e.g. a filling degree of the separation space with heavy phase and/or sludge.

According to embodiments, the control system may comprise a third pressure sensor arranged at a third radial position in the separation space, wherein the third radial position is radially between the first and second radial positions, and wherein the control unit is configured to determine a further parameter of the process liquid within the separation space during operation of the centrifugal separator based on measurements from the third pressure sensor and at least one of the first and second pressure sensors. In this manner, conditions are provided for utilising the further parameter determined during operation of the centrifugal separator and/or during operation of a system comprising the centrifugal separator.

The further parameter of the process liquid may be e.g. a pressure difference between measurements of the first and second pressure sensors, a radial position of an interface between the light phase and the heavy phase, or a density of the heavy phase.

According to a further aspect of the invention, there is provided a computer program comprising instructions which, when the program is executed by a computer, cause the computer to carry out the method according to any one of aspects and/or embodiments discussed herein.

According to a further aspect of the invention, there is provided a computer-readable storage medium comprising instructions which, when executed by a computer, cause the computer to carry out the method according to any one of aspects and/or embodiments discussed herein.

Further features of, and advantages with, the invention will become apparent when studying the appended claims and the following detailed description.

BRIEF DESCRIPTION OF THE DRAWINGS

Various Aspects and/or Embodiments of the Invention, Including its Particular Features and Advantages, Will be Readily Understood from the Example Embodiments Discussed in the Following Detailed Description and the Accompanying Drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
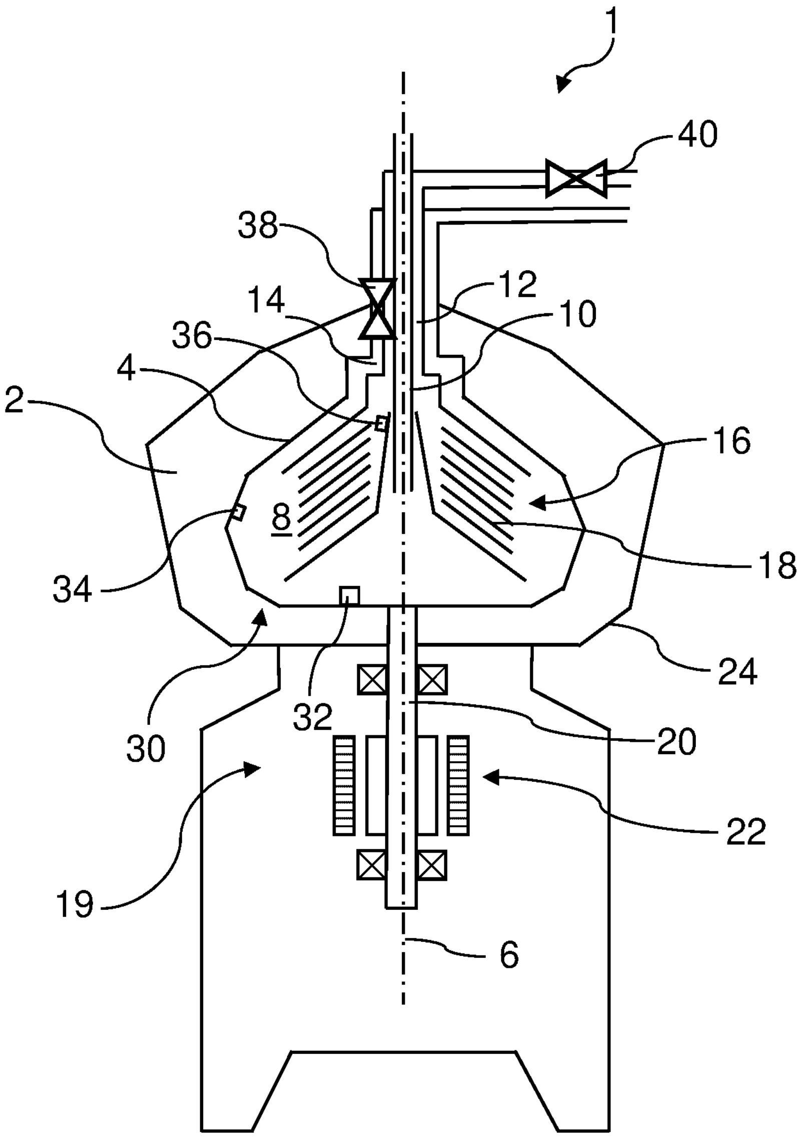
FIGS. 1-3 schematically illustrate embodiments of centrifugal separators.

FIG. 1 schematically illustrates embodiments of a centrifugal separation system 1. The centrifugal separation system 1 comprises a centrifugal separator 2 and a control system 30. The centrifugal separator 2 is shown in a cross-sectional view in FIG. 1.

The centrifugal separator 2 is configured for separating a liquid feed mixture into a light phase and a heavy phase. The centrifugal separator 2 comprises a rotor 4. The rotor 4 is configured to rotate about a vertical axis 6 of rotation and is provided with a separation space 8. The centrifugal separator 2 further comprises an inlet 10 leading into the separation space 8, a light phase outlet 12 leading from the separation space 8, a heavy phase outlet 14 leading from the separation space 8, and a stack 16 of frustoconical separation disks 18 arranged inside the separation space 8.

The rotor 4 may be driven by a drive arrangement 19 to be rotated. In the illustrated embodiments, the drive arrangement 19 comprises a spindle 20 and an electric motor 22. The rotor 4 is attached to the spindle 20. The spindle 20 forms part of the electric motor 22, i.e. the rotor 4 is directly driven by the electric motor 22. Alternatively, the drive arrangement 19 may comprise a spindle connected to the rotor, an electric motor, and a transmission arranged between the electric motor and the spindle. Thus, the drive arrangement 19 may rotate the rotor 4 about the vertical axis 6 of rotation. The rotor 4 is rotatably mounted inside a housing 24 of the centrifugal separator 2.

During separation of the liquid feed mixture in the separation space 8 of the rotor 4, the liquid feed mixture is lead via the inlet 10 from the centre of the rotor 4 into the separation space 8. The liquid feed mixture is separated into the light phase and the heavy phase. The separated light phase flows radially inwardly between the separation discs 18 towards the vertical axis 6 of rotation and out of the rotor 4 via the light phase outlet 12. The separated heavy phase flows radially outwardly between the separation discs 18 towards a periphery of the separation space 8 and out of the rotor 4 via the heavy phase outlet 14. Herein, each of the liquid feed mixture, the heavy phase, and the light phase are encompassed by the term process liquid.

Centrifugal separators of this kind are known and come in a number of different types and sizes. The present invention is generally applicable to different types and sizes of centrifugal separators of this kind. Unless specified, e.g. with reference to certain embodiments, the present invention is not limited to the type and arrangement of the inlet 10, the light phase outlet 12, and the heavy phase outlet 14. The inlet 10 and the outlets 12, 14 may be e.g. open, and/or mechanically hermetically sealed, and/or provided with paring discs. They may be provided at an upper end of the rotor 4 as illustrated in FIG. 1, and/or at a lower end of the rotor 4, and/or at an outer periphery of the rotor 4, as illustrated e.g. in FIGS. 2 and 3.

As mentioned above, the centrifugal separation system 1 comprises a control system 30. The control system 30 comprises a control unit 32, a first pressure sensor 34 arranged at a first radial position in the separation space 8, and a second pressure sensor 36 arranged at a second radial position in the separation space 8. The first radial position is radially outside the second radial position. The first and second pressure sensors 34, 36 are positioned to be submerged in process liquid during operation of the centrifugal separator.

The first and second pressure sensors 34, 36 are configured to communicate with the control unit 32. For instance, pressure measurements from the first and second pressure sensors 34, 36 may be communicated to the control unit 32. The control unit 32 is configured to determine a parameter of the process liquid within the separation space 8 during operation of the centrifugal separator 2 based on measurements from the first and second pressure sensors 34, 36. As mentioned above, each of the liquid feed mixture, the heavy phase, and the light phase are encompassed by the term process liquid.

Each of the first and second pressure sensors 34, 36 is configured to measure a pressure. The first pressure sensor 34 is configured to measure a pressure of the process liquid. The second pressure sensor 36 is configured to measure a pressure of the process liquid.

As mentioned above, the control unit 32 is configured to determine a parameter of the process liquid within the separation space 8 during operation of the centrifugal separator 2 based on measurements from the first and second pressure sensors 34, 36. The parameter may be directly or indirectly utilised during operation of the centrifugal separator 2 and/or during operation of the separation system 1.

According to embodiments, the parameter may be a pressure difference between the first and second pressure sensors 34, 36. In this manner, conclusions may be drawn from the pressure difference relating to the process liquid in the separation space 8. For instance, a radial position of an interface between the light and heavy phases, and/or an interface between sludge and the heavy phase may be determined.

According to embodiments, the parameter may be a density of the process liquid. In this manner, the density of the process liquid may be taken into account during operation of the centrifugal separator 2 and/or during operation of the separation system 1 comprising the centrifugal separator 2. For instance, the density of the heavy phase may be taken into account when determining a radial position of the in interface between the light and heavy phases.

More specifically, the control unit 32 may calculate the density of the process liquid present radially between the first and second pressure sensors 34, 36 by utilising pressure readings from the sensors 34, 36, with knowledge about the force acting on the process liquid, i.e. depending on the rotational speed of the rotor 4, and the radial positions of the sensors 34, 36. For instance, the density may be calculated utilising the formula:

$$\frac{p1 - p2}{0.5 * w^2 * (rp1^2 - rp2^2) * 10^{-10}}$$

wherein p1 and p2 are the pressures measured by the respective first and second pressure sensors 34, 36 in bar, w is the rotor speed in rad/s, and rp1 and rp2 are the respective radial positions of the first and second pressure sensors 34, 36 in mm.

Mentioned as an example, in order to determine the density of the heavy phase or sludge, the heavy phase or sludge may be permitted to extend radially over the first and second pressure sensors 34, 36. Once the density has been determined, the first and second pressure sensors may be utilised for determining a radial position of the interface between the light and heavy phases, and/or an interface between sludge and the heavy phase.

Similarly, at the beginning of a separation operation, before any substantial amounts of heavy phase or sludge have accumulated in the separation space 8, the density of the light phase may be determined. Then only light phase extends radially over the first and second pressure sensors 34, 36 and the density of the light phase may be calculated.

The centrifugal separation system 1 may comprise at least one flow controlling means 38, 40. The control unit 32 may be configured to control the flow controlling means 38, 40 based on the parameter. The flow controlling means may be utilised for controlling flow of process liquid. This may be advantageous during normal operation of the centrifugal separator 2, but may also, or alternatively, be utilised during a particular stage of the operation of the centrifugal separator 2, such as e.g. during start-up of the centrifugal separator 2 and/or the separation of the liquid feed mixture. Below, nonlimiting examples of various flow controlling means are discussed.

According to embodiments, the centrifugal separation system 1 may comprise a heavy phase valve 38 arranged in the heavy phase outlet 14, wherein the flow controlling means comprises the heavy phase valve 38. In this manner, the control unit 32 may control a flow of heavy phase through the heavy phase outlet 14. The heavy phase valve 38 may be a shut-off valve with only an open and a closed position. Alternatively, the heavy phase valve 38 may be a proportional valve configured to control the amount of flow there through.

According to embodiments, the centrifugal separation system 1 may comprise a light phase valve 40 arranged in the light phase outlet 12, wherein the flow controlling means comprises the light phase valve 40. In this manner, the control unit 32 may control a flow of the light phase through the light phase outlet 12. The light phase valve 40 may be a shut-off valve with only an open and a closed position. Alternatively, the light phase valve 40 may be a proportional valve configured to control the amount of flow there through.

The heavy phase valve 38 and/or the light phase valve 40 may be arranged in, or at, the rotor 4 to rotate together with the rotor 4, as indicated in FIG. 1 by the position of the heavy phase valve 38. Alternatively, the heavy phase valve 38 and/or the light phase valve 40 may be arranged further downstream in a stationary portion of the respective outlet 14, 12, as indicated in FIG. 1 by the position of the light phase valve 40.

In the embodiments of FIG. 1, the control unit 32 of the control system 30 is arranged in the rotor 4. Alternatively, the control unit 32 may be arranged in a stationary portion of the centrifugal separator 2 or as part of the centrifugal separation system 1 outside of the centrifugal separator 2 as in the embodiments of FIG. 2, or the control unit may be a distributed control unit 32, 32' as in the embodiments of FIG. 3.

Figure 2:
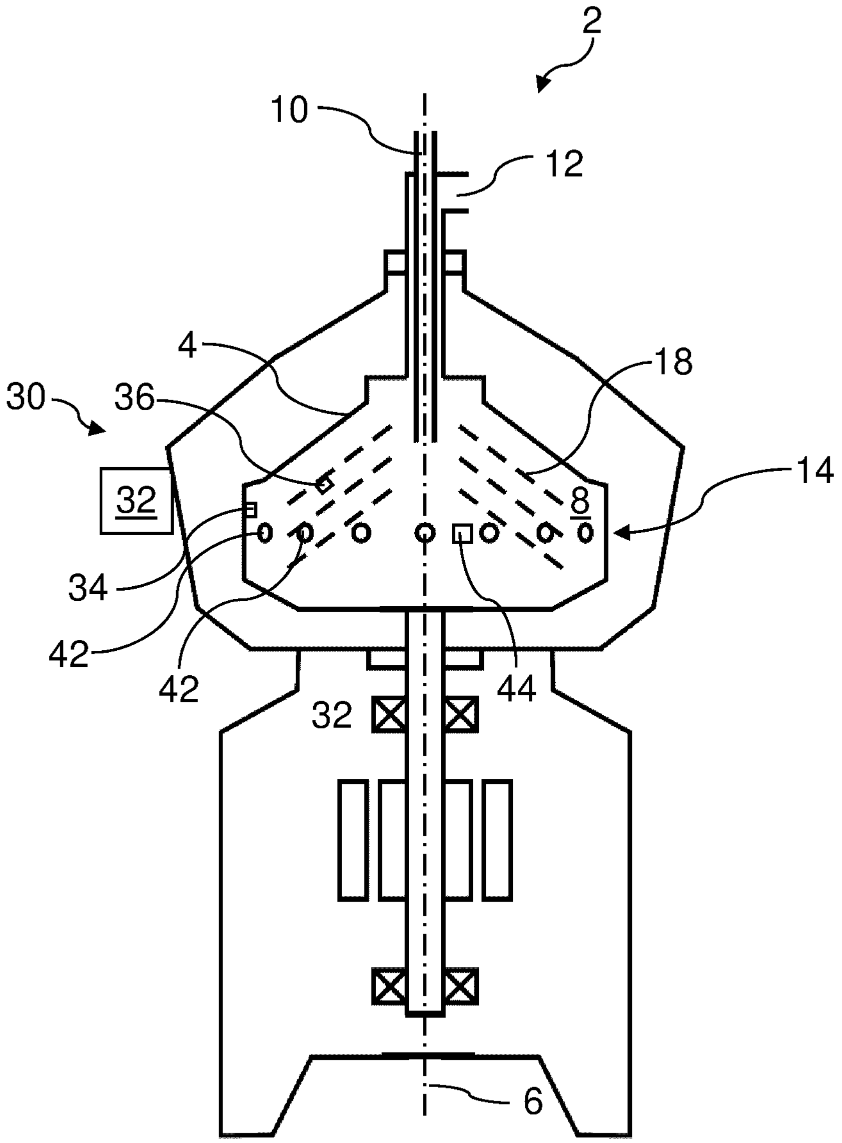

FIG. 2 schematically illustrates embodiments of a centrifugal separation system 1. The centrifugal separation system 1 resembles in much the centrifugal separation system 1 of FIG. 1. Accordingly, in the following mainly the differences between the embodiments will be discussed.

Again, the centrifugal separator 2 is configured for separating a liquid feed mixture into a light phase and a heavy phase. The centrifugal separator 2 comprises a rotor 4, configured to rotate about a vertical axis 6. The centrifugal separator 2 further comprises an inlet 10 leading into a separation space 8 and a light phase outlet 12 leading from the separation space 8. A stack of separation disks 18 is arranged inside the separation space 8.

Mentioned as an example, the mechanism 44 may comprise a sliding element displaceable by an actuator. The slidable element is configured to be slid between at least one open nozzle position and a position in which at least part of at least one nozzle 42 is covered.

Again, the centrifugal separation system 1 comprises a control system 30 which comprises a control unit 32, a first pressure sensor 34 arranged at a first radial position in the separation space 8, and a second pressure sensor 36 arranged at a second radial position in the separation space 8.

The centrifugal separator 2 comprises a heavy phase outlet 14 leading from the separation space 8. In these embodiments, the heavy phase outlet 14 comprises nozzles 42 arranged at an outer periphery of the rotor 4. In this manner, a liquid feed mixture having a large heavy phase content may be separated in the centrifugal separator 2. At least one of the nozzles 42 is always at least partially open during operation of the centrifugal separator 2. Thus, the heavy phase is continuously ejected through one or more of the nozzles 42 during operation of the centrifugal separator 2.

According to embodiments, wherein the centrifugal separator 2 comprises flow controlling means, the flow controlling means may comprise a mechanism 44 for changing a total opening area of the nozzles 42. In this manner, the flow of separated heavy phase through the heavy phase outlet 14 may be controlled.

Accordingly, the control unit 32 may be configured to control the mechanism 44 based on the parameter. Thus, the flow of separated heavy phase through the nozzles 42 of the heavy phase outlet 14 may be controlled based on the parameter. Mentioned purely as an example, the position of an interface between the light and heavy phases in the separation space 8 may form a parameter to be utilised for controlling the total opening area of the nozzles 42.

In the embodiments of FIG. 2, the control unit 32 of the control system 30 is arranged in a stationary portion of the centrifugal separator 2 or as part of the centrifugal separation system 1 outside of the centrifugal separator 2. The pressure sensors 34, 36 communicate wirelessly with the control unit 32, either directly or via a non-shown transmitter or transceiver arranged in the rotor 4. Alternatively, the control unit 32 of the control system 30 may be arranged in the rotor 4, as in the embodiments of FIG. 1, or the control unit may be a distributed control unit 32, 32' as in the embodiments of FIG. 3.

Figure 3:
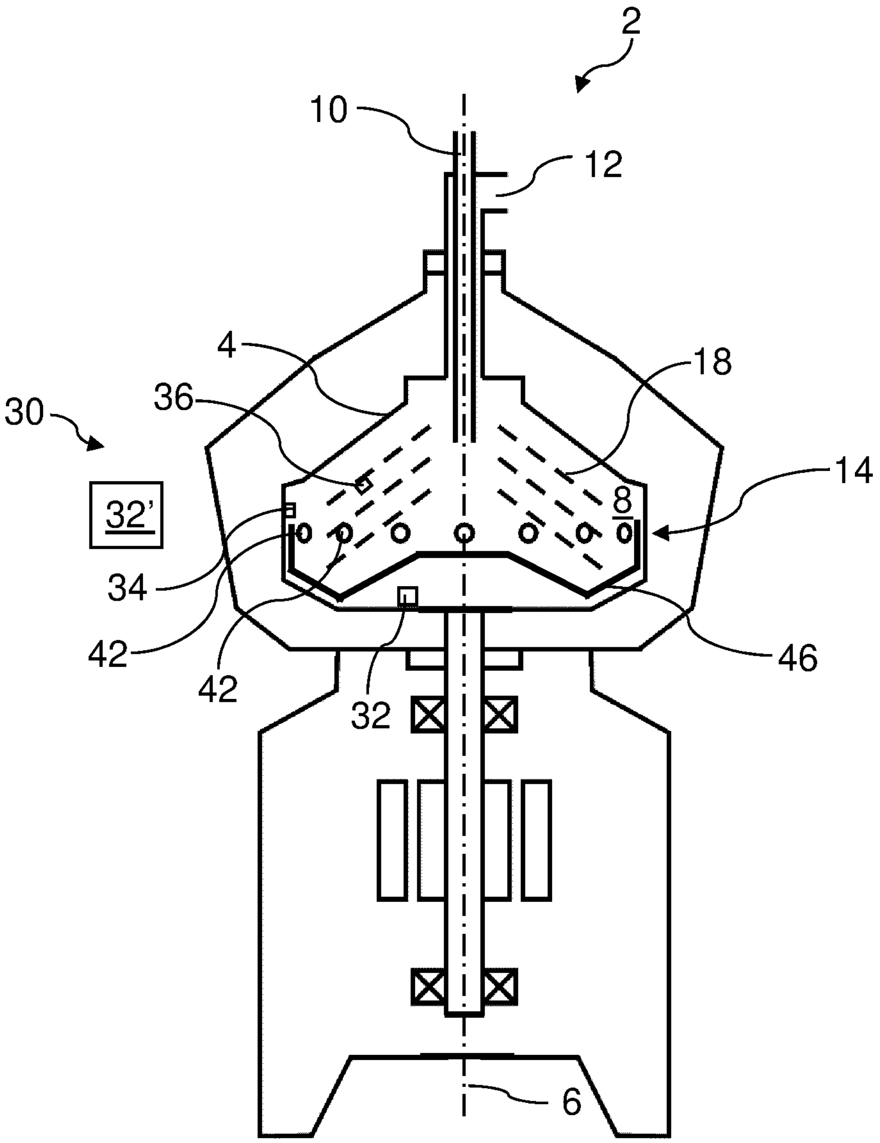

FIG. 3 schematically illustrates embodiments of a centrifugal separation system 1. The centrifugal separation system 1 resembles in much the centrifugal separation system 1 of FIGS. 1 and 2. Accordingly, in the following mainly the differences between the embodiments will be discussed.

Again, the centrifugal separator 2 is configured for separating a liquid feed mixture into a light phase and a heavy phase. The centrifugal separator 2 comprises a rotor 4, configured to rotate about a vertical axis 6. The centrifugal separator 2 further comprises an inlet 10 leading into a separation space 8 and a light phase outlet 12 leading from the separation space 8. A stack of separation disks 18 is arranged inside the separation space 8.

Again, the centrifugal separator 2 comprises a control system 30 which comprises in this case at least two control units 32, 32', a first pressure sensor 34 arranged at a first radial position in the separation space 8, and a second pressure sensor 36 arranged at a second radial position in the separation space 8.

Again, the centrifugal separator 2 comprises a heavy phase outlet 14 leading from the separation space 8, the heavy phase outlet 14 comprising nozzles 42 arranged at an outer periphery of the rotor 4.

In these embodiments, the flow controlling means comprises a slidable bowl bottom 46 configured to open and close the nozzles 42. In this manner, the separated heavy phase is only ejected when the slidable bowl bottom 46 is opening the nozzles 42. Put differently, the heavy phase outlet 14 is only open when the slidable bowl bottom 46 is in a position where the nozzles 42 are open. The slidable bowl bottom as such and its operating mechanism is known in the art.

At least one of the control units 32, 32' may be configured to control the slidable bowl bottom 46 based on the parameter. Thus, the flow of separated heavy phase through the nozzles 42 of the heavy phase outlet 14 may be controlled based on the parameter. Mentioned as an example, the position of an interface between the light and heavy phases in the separation space 8 may form a parameter to be utilised for controlling the opening and closing of the nozzles 42.

According to further embodiments, the centrifugal separator 2 comprises a light phase outlet 12 and a heavy phase outlet 14 as discussed in connection with FIG. 1. The centrifugal separator 2 further comprises a sludge outlet, wherein the sludge outlet comprises nozzles 42 arranged at an outer periphery of the rotor 4. That is, the sludge outlet comprises nozzles 42 as discussed in connection with FIG. 3. More specifically, instead of forming a heavy phase outlet, the nozzles 42 form the sludge outlet. The flow controlling means comprises the slidable bowl bottom 46 configured to open and close the nozzles 42, and is controlled by ate least one of the control units 32, 32' for intermittently ejecting sludge from the separation space 8.

The at least one of the control units 32, 32' may be configured to control the slidable bowl bottom 46 based on the parameter. Thus, the flow of sludge through the nozzles 42 of the sludge outlet may be controlled based on the parameter. Mentioned as an example, the position of an interface between sludge and heavy phase in the separation space 8 may form a parameter to be utilised for controlling the opening and closing of the nozzles 42.

In the embodiments of FIG. 3, the control system 30 is a distributed control system comprising the control units 32, 32', i.e. the control system 30 comprises more than one control unit 32, 32', e.g. one control unit 32 arranged in the rotor 4 and one control unit 32' arranged in a stationary portion of the centrifugal separator 2 or as part of the centrifugal separation system 1 outside of the centrifugal separator 2. The more than one control units 32, 32' may perform different tasks, such as control tasks, calculation tasks, and communication tasks. Alternatively, the control unit 32 of the control system 30 may be arranged in the rotor 4, as in the embodiments of FIG. 1, or the control unit 32 may be arranged in a stationary portion of the centrifugal separator 2 or as part of the centrifugal separation system 1 outside of the centrifugal separator 2 as in the embodiments of FIG. 2.

Figure 4:
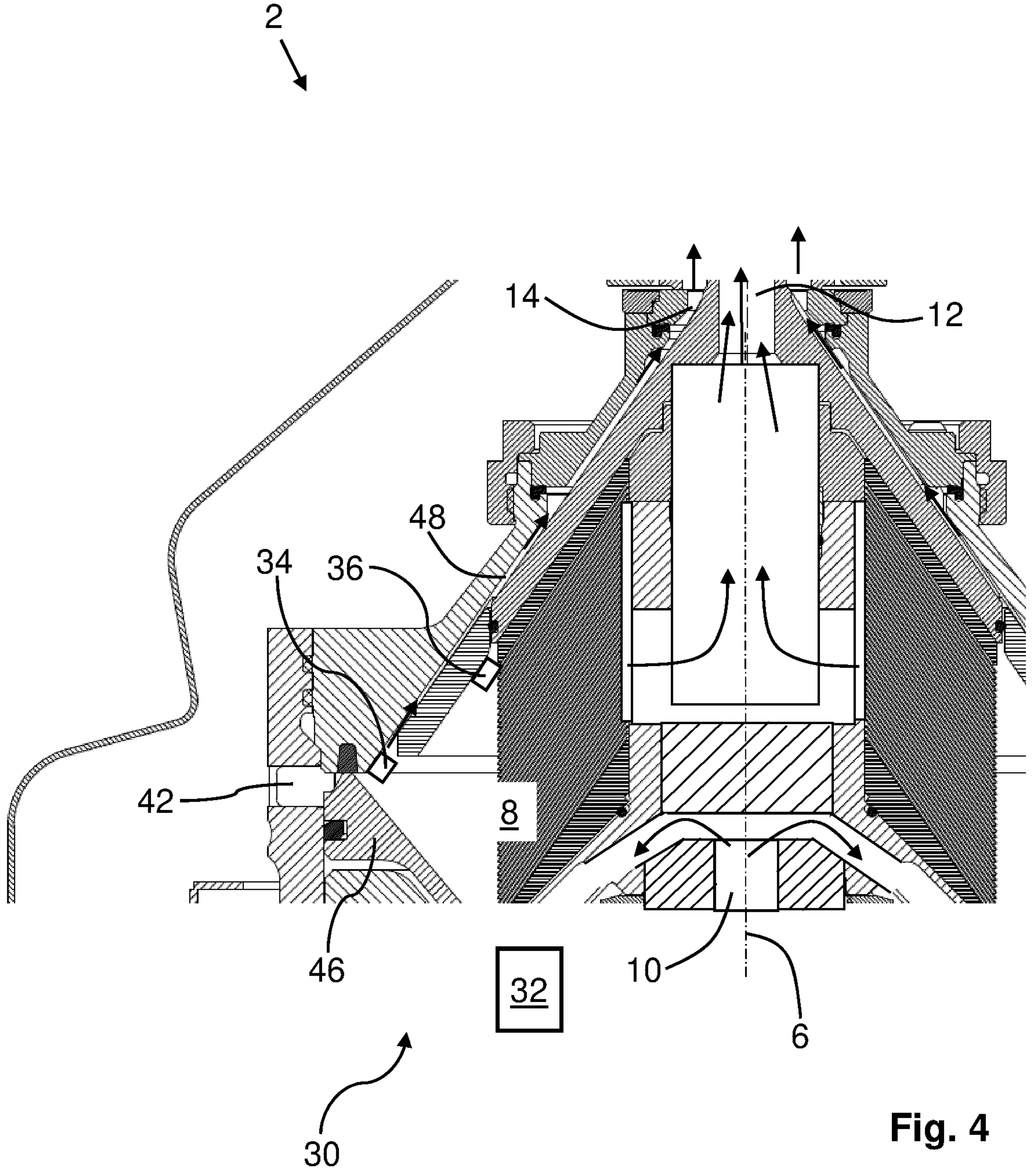
FIG. 4 schematically illustrates a cross-section through a portion of a centrifugal separator according to embodiments.

FIG. 4 schematically illustrates a cross-section through a portion of a centrifugal separator 2 of a centrifugal separation system 1 according to embodiments. The centrifugal separation system 1 resembles in much the centrifugal separation system 1 of the embodiments of FIGS. 1-3 and the embodiments comprising a sludge outlet discussed above. Accordingly, in the following mainly the differences between the embodiments will be discussed.

In these embodiments, the heavy phase outlet 14 comprises at least one channel 48 extending within the rotor 4 from a radially outer portion of the separation space 8 towards a central portion of the rotor 4. The heavy phase outlet 14 is mechanically hermetically sealed between the rotor 4 and a stationary portion of the centrifugal separator 2.

The flow of the process liquid through the centrifugal separator 2 is indicated with arrows in FIG. 4. The liquid feed mixture enters the rotor 4 via the inlet 10 at a lower portion of the rotor 4 and flows into the separation space 8. In the separation space 8, the liquid feed mixture is separated into a light phase flow out of the rotor via the light phase outlet 12, and a heavy phase flowing out of the rotor 4 via the heavy phase outlet 14. The inlet 10 and the light phase outlet 12 are also mechanically hermetically sealed.

The at least one channel 48 may comprise a tube, i.e. the at least one channel 48 has the same cross-sectional area along its extension. Alternatively, the at least one channel 48 may comprise a passage which has a larger cross-sectional area at the radially outer portion of the separation space 8 than towards the central portion of the rotor 4.

Also in these embodiments the centrifugal separator 2 comprises nozzles 42 arranged at an outer periphery of the rotor 4. Flow controlling means comprising a slidable bowl bottom 46 are provided for opening and closing the nozzles 42.

In these embodiments, depending on the contents of the liquid feed mixture and the resulting phases from the separation thereof, the nozzles 42 may form part either of a heavy phase outlet, a sludge outlet, or a combined sludge and heavy phase outlet.

Again, the control unit 32 may be configured to control the slidable bowl bottom 46 based on the parameter. Thus, ejection of heavy phase and/or a sludge through the nozzles 42 may be controlled. Mentioned as examples, the position of an interface between sludge and heavy phase, or a position of an interface between the heavy phase and the light phase, in the separation space 8, may form a parameter to be utilised for controlling the opening and closing of the nozzles 42.

FIGS. 5*a*-5*e* illustrate cross sections through embodiments of rotors 4 of centrifugal separators, such as the centrifugal separators 2 forming part of centrifugal separation systems 1 discussed above with reference to FIGS. 1-4.

In FIGS. 5*a*-5*e* different positions and numbers of the pressure sensors arranged in the rotor 4 are schematically illustrated. The rotors 4 shown in FIGS. 5*a*-5*e* are provided with a heavy phase outlet arranged towards a centre of the rotor 4. However, the embodiments are not limited to this kind of rotor 4. Alternatively, the rotor 4 may be provided with the heavy phase outlet at the radially outer periphery of the rotor 4, or the rotor 4 may be additionally be provided with a sludge outlet at the radially outer periphery of the rotor 4, as discussed above with reference to FIGS. 2-4.

The centrifugal separation system 1 comprises a control system 30, as discussed above with reference to FIGS. 1-4, and with reference to FIG. 6 below. The control unit 32 of the control system 30 has been illustrated arranged in the rotor 4, but the control unit 32 may be arranged as in any one the embodiments discussed above with reference to FIGS. 1-4, or any other suitable manner. Various example embodiments of the control system 30 will be further discussed with reference to FIGS. 5*a*-5*e*. Again, the control system 30 comprises one or more control units 32, a first pressure sensor 34, and a second pressure sensor 36. The first and second pressure sensors 34, 36 are arranged within the separation space 8 at different radial positions such that they may take pressure readings from process liquid inside the separation space 8.

As mentioned above, the first and second pressure sensors 34, 36 are configured to communicate with the control unit 32 and the control unit 32 is configured to determine a parameter of the process liquid within the separation space 8 during operation of the centrifugal separator 2 based on measurements from the first and second pressure sensors 34, 36.

Herein, the term radially outside the stack of separation discs corresponds to a radial position outside the radial extension of the stack of separation disks. The term radially inside the stack of separation discs corresponds to a radial position within the radial extension of the stack of separation discs, i.e. a radial position between the inner and outer radii of the stack of separation disks. The term radially inside the stack of separation discs corresponds to a radial position inside the inner radius of the stack of separation disks.

According to embodiments illustrated inter alia in FIGS. 5*a*-5*c*, and 5*e*, the first pressure sensor 34 may be arranged radially outside the stack 16 of separation disks 18. Accordingly, the first pressure sensor 34 may measure a pressure in a portion of the rotor 4 and the separation space 8 where separated heavy phase and/or separated sludge accumulates during operation of the centrifugal separator. Thus, the determined parameter may reflect a measurement affected by the heavy phase and/or sludge in the separation space.

Figure 5A:
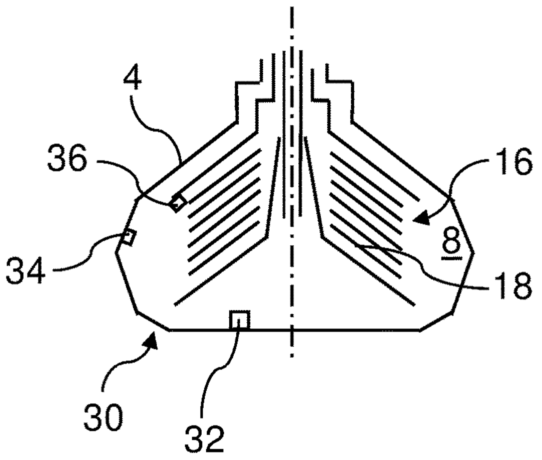
FIGS. 5*a*-5*e* illustrate cross-sections through embodiments of rotors of centrifugal separators.
Figure 5B:
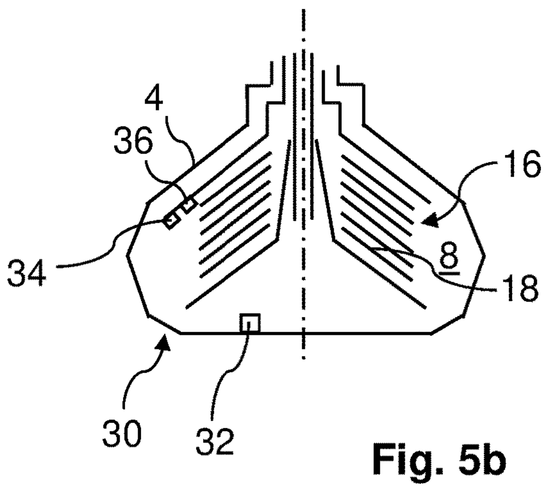

According to embodiments illustrated in FIGS. 5*a* and 5*b*, the second pressure sensor 36 may be arranged radially outside the stack 16 of separation disks 18. Thus, since the second pressure sensor 36 is arranged radially inside the first pressure sensor 34, the second pressure sensor 36 may measure a pressure in the separation space 8, which under some conditions during operation of the centrifugal separator is affected by separated heavy phase and/or sludge and under other conditions during operation of the centrifugal separator is affected by liquid feed mixture or separated light phase. Thus, the determined parameter may reflect e.g. a filling degree of the separation space with heavy phase and/or sludge, or a density of the heavy phase and/or the sludge.

Mentioned as an example, in the embodiments of FIGS. 5*a* and 5*b*, the parameter may be a pressure difference between the first and second pressure sensors 34, 36. Monitoring the pressure difference e.g. via the control unit 32, will provide information about a radial position of an interface between the light and heavy phases, and/or an interface between sludge and the heavy phase in the separation space 8.

In the embodiments of the FIG. 5*a* the first pressure sensor 34 is positioned at, or close to, an outermost radial position within the separation space 8 and the second pressure sensor 36 is positioned towards the stack 16. During operation of the centrifugal separator a particular pressure difference may correspond to a particular radial position of the interface. If the pressure difference remains at a constant value within a certain pressure difference range during operation of the centrifugal separator, this indicates that the radial position of the interface remains constant. If the pressure difference remains constant at a maximum pressure difference in value, this indicates that the interface is radially inside the second pressure sensor 36.

In the embodiments of FIG. 5*b* the first and second pressure sensors 34, 36 are positioned close to each other within the separation space 8 radially outside the stack 16 of separation disks 18. During operation of the centrifugal separator, before the interface reaches the first pressure sensor 34, the pressure difference between the first and second pressure sensors 34, 36 remains constant. Once the interface passes the first pressure sensor 34 and thus, is between the first and second pressure sensors 34, 36, the pressure difference starts to increase. This is an indicator of the interface being in a radial position between the first and second pressure sensors 34, 36. The change in pressure difference as such may be utilised by the control system to control the centrifugal separator, e.g. to open nozzles of the rotor 4 by operating a slidable bowl bottom of the rotor 4.

Mentioned as an example, the radial distance between the first and second pressure sensors 34, 36 may be within a range of 8-50 mm, or within a range of 10-30 mm. The larger the density difference between the light phase and the heavy phase, the smaller the distance between the first and second pressure sensors may be.

According to embodiments illustrated inter alia in FIGS. 5*c*-5*e* and FIG. 1, the second pressure sensor 36 may be arranged radially within or radially inside the stack 16 of separation disks 18. More specifically, in FIG. 5*c* the second pressure sensor 36 is arranged radially within the stack 16, and in the embodiments of the FIG. 1 the second pressure sensor 36 is arranged radially inside the stack 16.

The Second Pressure Sensor 36 May Measure a Pressure of the Light Phase Separated in the Separation Space 8 Radially within or Radially Inside of the Stack 16 of Separation Discs 18.

Accordingly, the determined parameter may reflect a measurement affected by the light phase in the separation space. The determined parameter may reflect e.g. a filling degree of the separation space with heavy phase and/or sludge.

Figure 5C:
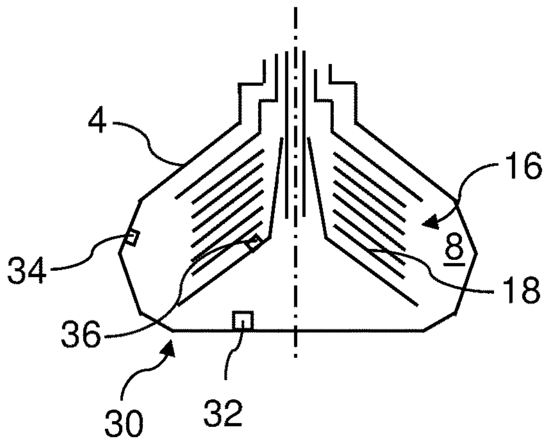

Mentioned as an example, in the embodiments of FIG. 5*c*, the parameter may be a pressure difference between the first and second pressure sensors 34, 36. Monitoring this pressure difference, will provide information about a radial position of an interface between the light and heavy phases. For instance, during operation of the centrifugal separator a particular pressure difference may correspond to a particular radial position of the interface.

Figure 5D:
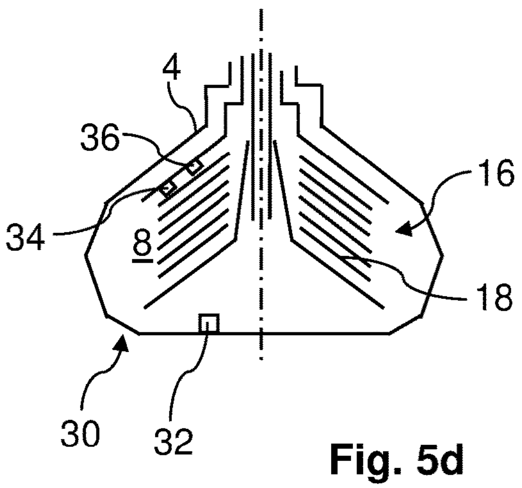

According to embodiments illustrated inter alia in FIG. 5*d*, the first pressure sensor 34 may be arranged radially within the stack 16 of separation disks 18. In this manner, a pressure difference over the stack 16, or part of the stack 16, may be monitored. If the pressure difference should exceed a threshold level, conclusions may be drawn about clogging of the stack 16 of separation disks 18.

Figure 5E:
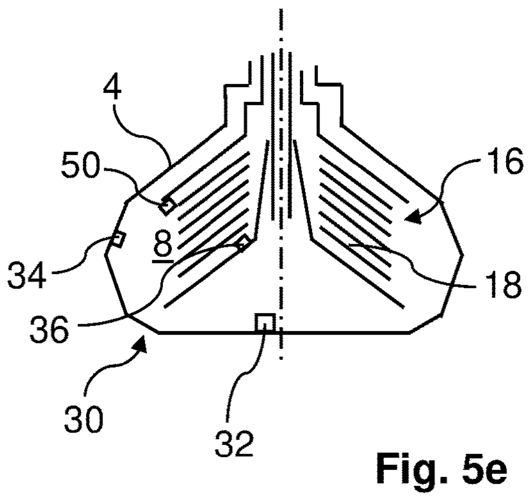

According to embodiments illustrated in FIG. 5*e*, the control system 40 may comprise a third pressure sensor 50 arranged at a third radial position in the separation space 8, wherein the third radial position is radially between the first and second radial positions, and wherein the control unit 32 is configured to determine a further parameter of the process liquid within the separation space 8 during operation of the centrifugal separator based on measurements from the third pressure sensor 50 and at least one of the first and second pressure sensors 34, 36.

The further determined parameter may be utilised during operation of the centrifugal separator and/or during operation of a system comprising the centrifugal separator. The further parameter may be e.g. a pressure difference in, or a density of, constituents of the process liquid. Accordingly, the further parameter may be e.g. a pressure difference between the first and third pressure sensors 34, 50, a pressure difference between the third and second pressure sensors 50, 36, or a density based on pressure measurements from the first and third pressure sensors 34, 50. In the latter case, suitably, the third radial position is radially outside the stack 16 of separation disks 18.

The density based on pressure measurements from the first and third pressure sensors 34, 50 may be calculated during operation of the centrifugal separator when a pressure difference between the first and third pressure sensors 34, 50 no longer changes. This means that the radial distance between the first and third pressure sensors 34, 50 is filled with heavy phase or sludge. As discussed above, with knowledge about the radial positions of the first and third pressure sensors 34, 50, the rotational speed of the rotor 4, and the pressure difference between the first and third pressure sensors 34, 50, the density of the heavy phase or sludge may be calculated.

Figure 6:
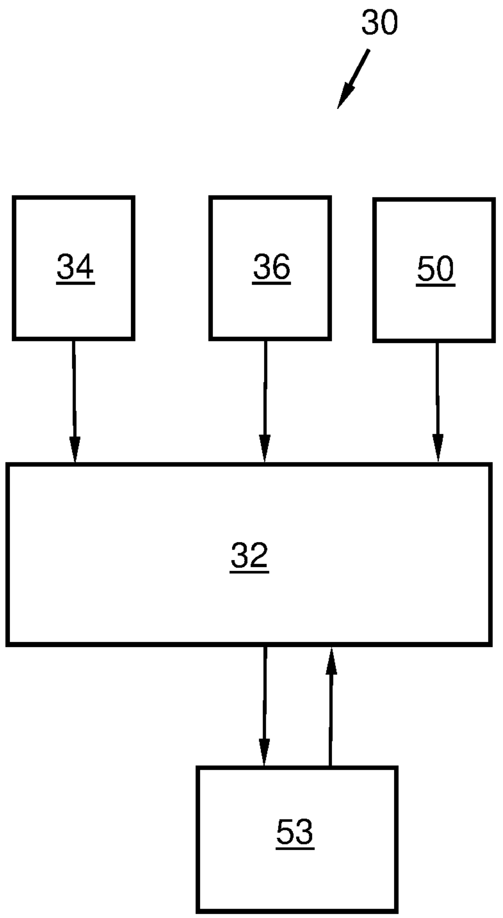
FIG. 6 illustrates a control system according to embodiments.

FIG. 6 illustrates a control system 30 according to embodiments to be utilised in connection with the different aspects and/or embodiments of the invention. The control system 30 is also indicated in FIGS. 1-5*e*. The control system 30 comprises at least one control unit 32, which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "control unit" may represent a processing circuitry comprising a plurality of processing circuits, such as, e.g., any, some or all of the ones mentioned above. The control system 30 comprises a memory unit 53. The control unit 32 is connected to the memory unit 53, which provides the control unit 32 with, e.g. stored programme code, data tables, and/or other stored data which the control unit 32 needs to enable it to do calculations and to control the centrifugal separator and optionally a control a system comprising the centrifugal separator. The control unit 32 is also adapted to store partial or final results of calculations in the memory unit 53. The memory unit 53 may comprise a physical device utilised to store data or programs, i.e. sequences of instructions on a temporary or permanent basis. According to some embodiments, the memory unit 53 may comprise integrated circuits comprising silicon-based transistors. The memory unit 53 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control system 30 further comprises the first and second pressure sensors 34, 36. Optionally, the control system 30 may comprise the third pressure sensor 50. The control unit 32 communicates with the pressure sensors 34, 36, 50 and receives pressure measurements from these sensors. The control unit 32 is configured to receiving output signals from the sensors 34, 36, 50. These signals may comprise waveforms, pulses or other attributes, which can be detect as information by control unit 32, and which can be directly or indirectly converted to signals processable by the control unit 32. Each of the connections to the respective sensors may take the form of one or more from among a cable, a data bus, e.g. a CAN (controller area network) bus, a MOST (media orientated systems transport) bus or some other bus configuration, or a wireless connection. In the embodiment depicted, only one control unit 32 and memory 53 are shown, but the control system 30 may alternatively comprise more than one control unit and/or memory.

The control unit 32 may be arranged in the rotor 4 as indicated in FIGS. 1-5*e*. Alternatively, the control unit 32 may be arranged outside of the rotor 4, and may communicate e.g. wirelessly with the sensors 34, 36, 50. In embodiments comprising more than one control unit may comprise one or more control units arranged in the rotor 4 and one or more control units arranged outside of the rotor 4.

The control unit 32 and sensors 34, 36, 50 may be battery powered by batteries arranged in the rotor of the centrifugal separator. Alternatively, the electric energy may be supplied to the control unit and sensors by a generator arranged in the rotor, a rotary transformer, or slip rings.

An example of data may be pressure measurement data. The pressure sensors 34, 36, 50 are configured to provide pressure measurements. Optionally, one or more of the sensors 34, 36, 50 may provide measurements of other physical quantities such as e.g. temperature measurements. Such temperature measurements may be utilised when determining a density of one or more of the constituents of the liquid feed mixture. Alternatively, a separate temperature sensor (not shown) may provide temperature measurements to the control unit 32.

Examples of data tables may be a table containing positions of an interface between e.g. the light and heavy phases mapped against different values of the pressure difference between measurements from the first and second sensors 34, 36, or from the first and third sensors 34, 50, or a data table mapping light phase and/or heavy phase density against temperature.

Figure 7:
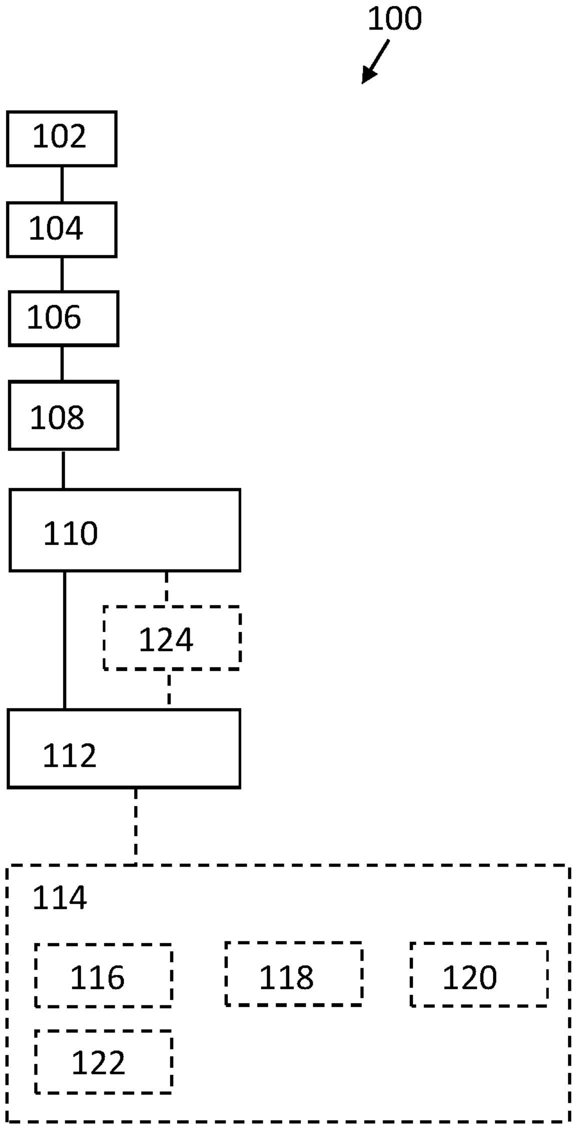
FIG. 7 illustrates embodiments of a method of operating a centrifugal separator.

FIG. 7 illustrates embodiments of a method 100 of operating a centrifugal separator. The centrifugal separator may be a centrifugal separator 2 according to any one of embodiments discussed in connection with FIGS. 1-4, and/or comprising a rotor 4 comprising a control system 30 as discussed in connection with FIGS. 5*a*-6. In the following reference is also made to FIGS. 1-6.

Accordingly, the rotor 4 is provided with a separation space 8, an inlet 10 leading into the separation space 8, a first pressure sensor 34 arranged at a first radial position in the separation space 8, and a second pressure sensor 36 arranged at a second radial position in the separation space 8.

The method 100 comprises steps of:

rotating 102 the rotor 4, conducting 104 liquid feed mixture into the separation space 8 via the inlet 10, submerging 106 at the first and second pressure sensors 34, 36 in the process liquid, measuring 108 a first pressure with the first pressure sensor 34, measuring 110 a second pressure with the second pressure sensor 36, and determining 112 a parameter of the process liquid based on the first and second pressures.

As discussed above, the parameter of the process liquid may be e.g. a pressure difference between measurements of the first and second pressure sensors 34, 36, a radial position of an interface between the light phase and the heavy phase, or a density of the heavy phase. Further physical quantities, such as temperature, of the process liquid may be utilised for determining the parameter.

According to embodiments, the parameter may be a pressure difference between the first and second pressure sensors 34, 36.

According to embodiments, the parameter may be a density of the process liquid.

According to embodiments, the centrifugal separator 2 may comprise a flow controlling means 38, 40, and the method 100 may comprise a step of:

controlling 114 the flow controlling means 38, 40 based on the parameter. See further above, inter alia with reference to FIGS. 1-4.

According to embodiments, the flow controlling means comprises a heavy phase valve 38 arranged in the heavy phase outlet 14, the step of controlling 114 the flow controlling means may comprise a step of:

controlling 116 the heavy phase valve 38. See further above, inter alia with reference to FIG. 1.

According to embodiments, wherein the flow controlling means comprises a light phase valve 40 arranged in the light phase outlet 12, the step of controlling 114 the flow controlling means may comprise a step of:

controlling 118 the light phase valve 40. See further above, inter alia with reference to FIG. 1.

According to embodiments, wherein the centrifugal separator 2 comprises nozzles 42 arranged at an outer periphery of the rotor 4, and wherein the flow controlling means comprises a slidable bowl bottom 46 configured to open and close the nozzles 42, the step of controlling 114 the flow controlling means may comprise a step of:

controlling 120 the sliding bowl bottom 46 to open and close the nozzles 42. See further above, inter alia with reference to FIGS. 3 and 4.

According to embodiments wherein the heavy phase outlet comprises the nozzles 42, the step of controlling 120 the sliding bowl bottom 46 to open and close the nozzles 42 will result in ejection of accumulated heavy phase from the periphery of the separation space 8 when the nozzles 42 are opened.

According to embodiments where in the centrifugal separator 2 comprises a sludge outlet, the sludge outlet comprising the nozzles 42, the step of controlling 120 the sliding bowl bottom 46 to open and close the nozzles 42 will result in ejection of accumulated sludge from the periphery of the separation space 8 when the nozzles 42 are opened.

According to embodiments, wherein the heavy phase outlet comprises nozzles 42 arranged at an outer periphery of the rotor 4, and wherein the flow controlling means comprises a mechanism 44 for changing a total opening area of the nozzles 42, the step of controlling 114 the flow controlling means may comprise a step of:

controlling 122 the mechanism 44 to change the total opening area. See further above, inter alia with reference to FIG. 2.

According to embodiments, wherein the centrifugal separator 2 comprises a third pressure sensor 50 arranged at a third radial position in the separation space 8, wherein the third radial position is radially between the first and second radial positions, the method 100 may comprise steps of:

measuring 124 a third pressure with the third pressure sensor 50, and determining 112 a further parameter of the process liquid based on the third pressure and at least one of the first and second pressures. See further above, inter alia with reference to FIG. 5*e*.

According to an aspect there is provided a computer program comprising instructions which, when the program is executed by a computer, cause the computer to carry out the method 100 according to any one of aspect and/or embodiments discussed herein, in particular with reference to FIG. 7. One skilled in the art will appreciate that the method 100 of operating a centrifugal separator may be implemented by programmed instructions. These programmed instructions are typically constituted by a computer program, which, when it is executed in a computer or control system, ensures that the computer or control system carries out the desired control, such as the method steps 102-124 according to the invention. The computer program is usually part of a computer programme product which comprises a suitable digital storage medium on which the computer program is stored.

Figure 8:
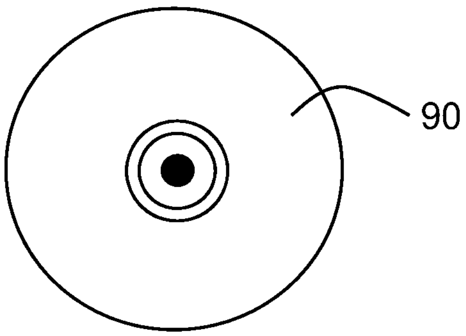
FIG. 8 shows a computer-readable storage medium according to embodiments.

FIG. 8 shows a computer-readable storage medium 90 according to embodiments. The computer-readable storage medium 90 comprises instructions which, when executed by a computer or other control system 30, causes the computer or other control system 30 to carry out the method 100 according to any one of aspects and/or embodiments discussed herein. The computer-readable storage medium 90 may be provided for instance in the form of a data carrier carrying computer program code for performing at least some of the steps 102-124 according to some embodiments when being loaded into the one or more control unit 32 of the control system 30. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer-readable storage medium may furthermore be provided as computer program code on a server and may be downloaded to the control system 30 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A centrifugal separation system comprising:

a centrifugal separator configured for separating a liquid feed mixture into a light phase and a heavy phase; and a control system, wherein a process liquid comprises one or more of the liquid feed mixture, the light phase, and the heavy phase, wherein the centrifugal separator comprises:

a rotor configured to rotate about a vertical axis of rotation;

a separation space;

an inlet leading into the separation space;

a light phase outlet leading from the separation space;

a heavy phase outlet leading from the separation space; and a stack of separation disks arranged inside the separation space, wherein the control system comprises;

a first pressure sensor arranged at a first radial position in the separation space; and a control unit;

a second pressure sensor arranged at a second radial position in the separation space, wherein the first radial position is radially outside the second radial position, wherein the first and second pressure sensors are positioned to be submerged in the process liquid during operation of the centrifugal separator, and wherein the control unit is configured to determine a parameter of the process liquid within the separation space during operation of the centrifugal separator based on measurements from the first and second pressure sensors.

2. The centrifugal separation system according to claim 1, wherein the parameter is a pressure difference between the first and second pressure sensors.

3. The centrifugal separation system according to claim 1, wherein the parameter is a density of the process liquid.

4. The centrifugal separation system according to claim 1, further comprising a flow controller, wherein the control unit is configured to control the flow controller based on the parameter.

5. The centrifugal separation system according to claim 4, further comprising a heavy phase valve arranged in the heavy phase outlet, wherein the flow controller comprises the heavy phase valve.

6. The centrifugal separation system according to claim 4, further comprising a light phase valve arranged in the light phase outlet, wherein the flow controller comprises the light phase valve.

7. The centrifugal separation system according to claim 4, wherein the heavy phase outlet comprises nozzles arranged at an outer periphery of the rotor.

8. The centrifugal separation system according to claim 1, further comprising a sludge outlet, wherein the sludge outlet comprises nozzles arranged at an outer periphery of the rotor.

9. The centrifugal separation system according to claim 7, wherein the flow controller comprises a slidable bowl bottom configured to open and close the nozzles.

10. The centrifugal separation system according to claim 7, wherein the flow controller comprises a mechanism for changing a total opening area of the nozzles.

11. The centrifugal separation system according to claim 1, wherein the heavy phase outlet comprises at least one channel extending within the rotor from a radially outer portion of the separation space towards a central portion of the rotor, and wherein the heavy phase outlet is mechanically hermetically sealed between the rotor and a stationary portion of the centrifugal separator.

12. The centrifugal separation system according to claim 1, wherein the first pressure sensor is arranged radially outside the stack of separation disks.

13. The centrifugal separation system according to claim 1, wherein the second pressure sensor is arranged radially outside the stack of separation disks.

14. The centrifugal separation system according to claim 1, wherein the second pressure sensor is arranged radially within or radially inside the stack of separation disks.

15. The centrifugal separation system according to claim 1, wherein the control system further comprises a third pressure sensor arranged at a third radial position in the separation space, wherein the third radial position is radially between the first and second radial positions, and wherein the control unit is configured to determine a further parameter of the process liquid within the separation space during operation of the centrifugal separator based on measurements from the third pressure sensor and at least one of the first and second pressure sensors.

16. A method of operating a centrifugal separator configured for separating a liquid feed mixture into a light phase and a heavy phase, wherein a process liquid comprises one or more of a liquid feed mixture, a light phase, and a heavy phase, wherein the centrifugal separator comprises:

a rotor configured to rotate about a vertical axis of rotation;

a separation space;

an inlet leading into the separation space;

a light phase outlet leading from the separation space;

a heavy phase outlet leading from the separation space;

a stack of separation disks arranged inside the separation space;

a first pressure sensor arranged at a first radial position in the separation space; and a second pressure sensor arranged at a second radial position in the separation space, wherein the first radial position is radially outside the second radial position, and wherein the method comprises steps of:

rotating the rotor;

conducting the liquid feed mixture into the separation space via the inlet;

submerging the first and second pressure sensors in the process liquid, liquid;

measuring a first pressure with the first pressure sensor;

measuring a second pressure with the second pressure sensor; and determining a parameter of the process liquid based on the first and second pressures.

17. The method according to claim 16, wherein the centrifugal separator further comprises a flow controller, and wherein the method comprises a step of controlling the flow controller based on the parameter.

18. The method according to claim 17, wherein the centrifugal separator further comprises nozzles arranged at an outer periphery of the rotor, wherein the flow controller comprises a slidable bowl bottom configured to open and close the nozzles, and wherein the step of controlling the flow controller comprises a step controlling the sliding bowl bottom to open and close the nozzles.

19. The method according to claim 16, wherein the centrifugal separator further comprises a third pressure sensor arranged at a third radial position in the separation space, wherein the third radial position is radially between the first and second radial positions, and wherein the method comprises steps of:

measuring a third pressure with the third pressure sensor; and determining a further parameter of the process liquid based on the third pressure and at least one of the first and second pressures.

20. The centrifugal separation system according to claim 2, further comprising a flow controller, wherein the control unit is configured to control the flow controller based on the parameter.

* * * * *